(12) United States Patent
Dawley et al.

(10) Patent No.: US 10,991,998 B2
(45) Date of Patent: Apr. 27, 2021

(54) THERMAL INTERFACE MEMBER AND METHOD OF MAKING THE SAME

(71) Applicant: GM GLOBAL TECHNOLOGY OPERATIONS LLC, Detroit, MI (US)

(72) Inventors: Evan J. Dawley, Lake Orion, MI (US); Herman K. Phlegm, West Bloomfield, MI (US); Mahmoud Abd Elhamid, Warren, MI (US); Chih-Cheng Hsu, Bloomfield Township, MI (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 16/259,295

(22) Filed: Jan. 28, 2019

(65) Prior Publication Data

US 2020/0243926 A1 Jul. 30, 2020

(51) Int. Cl.
*H01M 10/653* (2014.01)
*H01M 10/617* (2014.01)
*H01M 10/6551* (2014.01)
*H01M 10/625* (2014.01)
*H01M 10/613* (2014.01)

(52) U.S. Cl.
CPC ....... *H01M 10/653* (2015.04); *H01M 10/613* (2015.04); *H01M 10/617* (2015.04); *H01M 10/625* (2015.04); *H01M 10/6551* (2015.04); *H01M 2220/20* (2013.01)

(58) Field of Classification Search
CPC ............. H01M 10/653; H01M 10/617; H01M 10/613; H01M 10/6551; H01M 10/625; H01M 2220/20
See application file for complete search history.

(56) References Cited

U.S. PATENT DOCUMENTS 10,116,018 B2 10/2018 Phlegm et al.
2019/0140233 A1* 5/2019 Yeh ..................... H01M 2/1016

* cited by examiner

*Primary Examiner* — Osei K Amponsah
(74) *Attorney, Agent, or Firm* — Quinn IP Law

(57) ABSTRACT

A thermal interface member may comprise a substrate having a first surface and an opposite second surface, an electrically conductive layer disposed on the first surface of the substrate, and an electrically resistive layer disposed on the first surface of the substrate. The substrate may comprise a compliant electrically insulating and thermally conductive material including a polymeric matrix phase and a dispersed phase of thermally conductive particles. The conductive layer may be patterned into a first electrode and a second electrode spaced apart from the first electrode on the first surface of the substrate. The resistive layer may be in electrical contact with the first and second electrodes of the conductive layer and may comprise a resistive material having a positive resistance temperature coefficient and a resistance that increases with an increase in temperature.

20 Claims, 5 Drawing Sheets

THERMAL INTERFACE MEMBER AND METHOD OF MAKING THE SAME

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles. Electric vehicles, including hybrid electric vehicles, are powered by electric motors or generators that, in turn, are typically powered by onboard rechargeable batteries. Such batteries typically include a large number of individual battery cells, which may be arranged in series and positioned adjacent one another in battery packs and/or modules to provide the vehicle with a combination of high power and high capacity.

Rechargeable batteries employed in electric vehicles may be exposed to a wide range of temperatures during the operating life of the vehicle. To optimize the performance and life of such batteries, it is beneficial to effectively and efficiently control the temperature of the battery cells so that exposure to excessively high and low temperatures is avoided.

SUMMARY

A thermal interface member may comprise a substrate having a first surface and an opposite second surface, an electrically conductive layer disposed on the first surface of the substrate, and an electrically resistive layer disposed on the first surface of the substrate. The substrate may comprise a compliant electrically insulating and thermally conductive material, which may comprise a polymeric matrix phase and a dispersed phase of thermally conductive particles. The electrically conductive layer may be patterned into a first electrode and a second electrode spaced apart from the first electrode on the first surface of the substrate. The electrically resistive layer may be in electrical contact with the first and second electrodes of the conductive layer and may comprise a resistive material having a positive resistance temperature coefficient and a resistance that increases with an increase in temperature.

At least a portion of the conductive layer and at least a portion of the resistive layer may be in direct contact with the first surface of the substrate.

At least a portion of the resistive layer may partially overlap a portion of the conductive layer on the first surface of the substrate.

In one form, at least a portion of the resistive layer may be formed on the first surface of the substrate over the conductive layer. In another form, at least a portion of the conductive layer may be formed on the first surface of the substrate over the resistive layer.

The polymeric matrix phase of the substrate may comprise at least one of a silicone-, siloxane-, epoxy-, acrylic-, alkyd-, polyisobutylene-, polyurethane-, polyvinylidene-, polycycloolefin-, or cyclooctene-based material. The dispersed phase of thermally conductive particles may comprise at least one of boron nitride, alumina, silicon nitride, silicon carbide, aluminum nitride, diamond, synthetic diamond, or expanded graphene.

The conductive layer may comprise at least one of copper (Cu), gold (Au), silver (Ag), aluminum (Al), nickel (Ni), zinc (Zn), carbon (C), graphite, or graphene.

The resistive layer may comprise a polymeric matrix phase and a dispersed phase of electrically conductive particles. In such case, the polymeric matrix phase of the resistive layer may comprise a crystalline thermoplastic polymer.

A cover layer may be disposed on the first surface of the substrate. The cover layer may comprise a flexible electrically insulating material. In such case, the conductive layer and the resistive layer may be sandwiched between the cover layer and the first surface of the substrate. In one form, the cover layer may be physically bonded to the first surface of the substrate via an adhesive layer.

A base layer may be disposed on the first surface of the substrate. The base layer may comprise a flexible electrically insulating material. In such case, the conductive layer and the resistive layer may be disposed on the first surface of the substrate over the base layer.

An external power source may be electrically coupled to the conductive layer.

An electric power supply for a vehicle may comprise a cooling plate, a battery module supported on the cooling plate, and a thermal interface member disposed between the cooling plate and the battery module. The battery module may comprise a stack of battery cells, with each of the battery cells having a lower end adjacent the cooling plate and an opposite upper end extending away from the cooling plate.

The thermal interface member may conform to the shape of the lower ends of the battery cells such that a zero-gap interface is established between a surface of the thermal interface member and an opposing surface defined by the lower ends of the battery cells.

The thermal interface member may be disposed between the cooling plate and the battery module such that the electrically conductive layer and the electrically resistive layer are sandwiched between the thermally conductive substrate and the lower ends of the battery cells.

In a method of manufacturing a thermal interface member, a compliant electrically insulating and thermally conductive substrate may be provided. The substrate may have a first surface and an opposite second surface and may comprise a polymeric matrix phase and a dispersed phase of thermally conductive particles. An electrically conductive layer may be applied to the first surface of the substrate. The conductive layer may be patterned into a first electrode and a second electrode spaced apart from the first electrode on the first surface of the substrate. An electrically resistive layer may be applied to the first surface of the substrate. The resistive layer may be in electrical contact with the first and second electrodes of the conductive layer and may comprise a resistive material having a positive resistance temperature coefficient and a resistance that increases with an increase in temperature.

At least a portion of the conductive layer and at least a portion of the resistive layer may be formed directly on the first surface of the substrate.

In one form, the conductive layer may be formed directly on the first surface of the substrate, and then the resistive layer may be formed on the first surface of the substrate such that at least a portion of the resistive layer overlaps a portion of the conductive layer on the first surface of the substrate.

In another form, the resistive layer may be formed directly on the first surface of the substrate, and then the conductive layer may be formed on the first surface of the substrate such that at least a portion of the conductive layer overlaps a portion of the resistive layer on the first surface of the substrate.

In one form, a base layer may be provided having a first surface and an opposite second surface. The base layer may comprise a flexible electrically insulating material. In one form, the conductive layer and the resistive layer may be respectively formed on the first surface of the base layer. Then, the base layer may be placed on the first surface of the substrate such that the second surface of the base layer faces toward the substrate and the first surface of the base layer faces away from the substrate.

In another form, a cover layer may be provided having a first surface and an opposite second surface. The cover layer may comprise a flexible electrically insulating material. The conductive layer or the resistive layer may be formed on the second surface of the cover layer, and the conductive layer or the resistive layer may be formed on the first surface of the substrate. Then, the second surface of the cover layer and the first surface of the substrate may be brought together to bring the conductive layer and the resistive layer into electrical contact with one another.

BRIEF DESCRIPTION OF THE DRAWINGS

Illustrative embodiments will hereinafter be described in conjunction with the appended drawings, wherein like designations denote like elements, and wherein.

DETAILED DESCRIPTION

The thermal interface member described herein includes a layered heater disposed on a compliant electrically insulating and thermally conductive substrate, which may be placed in intimate thermal contact with a plurality of battery cells so that heat generated by the layered heater may be effectively and efficiently transferred to the battery cells via thermal conduction. In some embodiments, a first side of the thermal interface member may be placed in thermal contact with the plurality of battery cells and an opposite second side of the thermal interface member may be placed in thermal contact with a cooling plate so that heat may be transferred away from the battery cells through the thermal interface member via thermal conduction. Accordingly, the thermal interface member described herein can be used to help maintain a plurality of battery cells disposed adjacent one another, for example, in a battery pack or battery module, within an acceptable operating temperature range.

Figure 1:
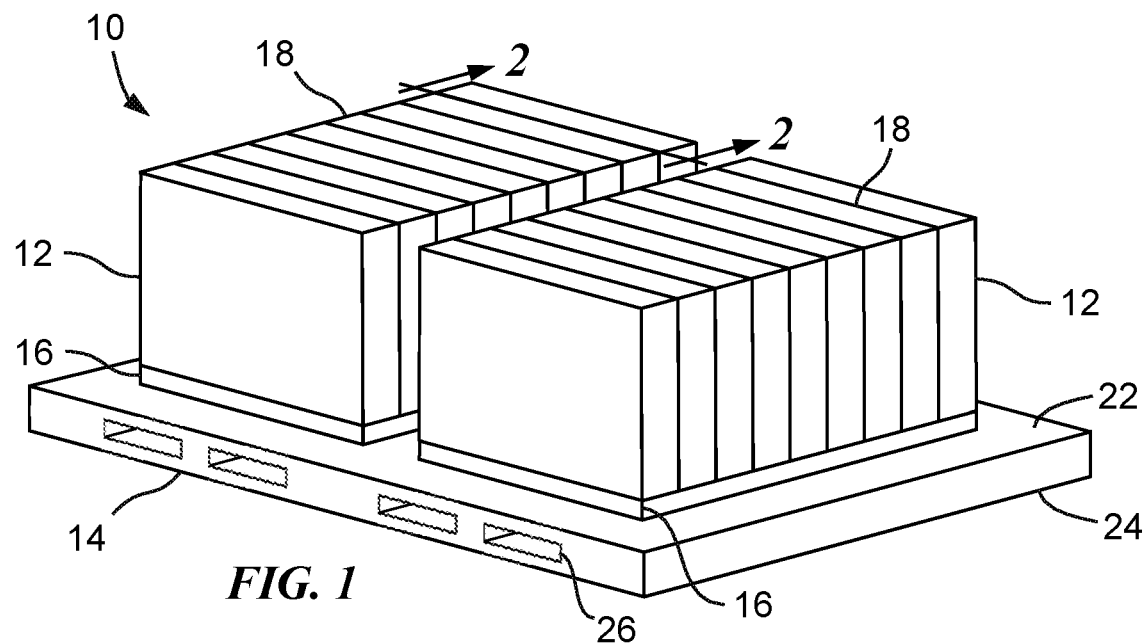
FIG. 1 is a schematic perspective view of a power supply for an electric vehicle including multiple battery modules supported on a cooling plate and having a thermal interface member disposed therebetween, with each battery module comprising a plurality of battery cells.

FIG. 1 illustrates an electric power supply 10 for an electric vehicle including multiple battery modules 12 supported on a cooling plate 14 and having a thermal interface member 16 disposed therebetween. Each battery module 12 includes a stack of battery cells 18, which may be held in a stacked arrangement and supported on the cooling plate 14 by a support frame 20. Together the cooling plate 14 and the thermal interface member 16 help regulate and control the temperature of the battery cells 18 of the battery modules 12.

The cooling plate 14 is configured to cool the battery cells 18 of the battery modules 12 and includes a top surface 22, an opposite bottom surface 24, and one or more cooling passages 26 extending in a lateral direction between the top and bottom surfaces 22, 24 of the cooling plate 14. During cooling of the battery cells 18, a coolant may be passed through the cooling passages 26 in the cooling plate 14 so that heat is transferred away from the battery cells 18 via thermal conduction through the thermal interface member 16. The cooling plate may comprise a metal having high thermal conductivity, e.g., aluminum (Al), copper (Cu), or an alloy of aluminum and/or copper.

Each battery cell 18 has a lower end 28 adjacent the cooling plate 14 and an opposite upper end 30 that extends away from the cooling plate 14. The upper end 30 of each battery cell 18 may include a pair of positive and negative electrode terminals 32, which may allow the battery cells 18 of each battery module 12 to be connected in a series or parallel arrangement. In one form, the battery cells 18 may comprise lithium ion battery cells. For example, the battery cells 18 may comprise prismatic pouch-type or can-type lithium ion battery cells.

The thermal interface member 16 is configured to transfer heat away from and to supply heat to the battery cells 18 of the battery modules 12 via thermal conduction and includes a first side 34 that defines an upper surface 36 of the thermal interface member 16 and an opposite second side 38 that defines a lower surface 40 of the thermal interface member 16. The thermal interface member 16 is disposed between and in thermal contact with the top surface 22 of the cooling plate 14 and the lower ends 28 of the battery cells 18 of the battery module 12. In particular, the thermal interface member 16 is sandwiched between the top surface 22 of the cooling plate 14 and the lower end 28 of each battery cell 18 such that the lower end 28 of each battery cell 18 is in direct contact with and presses against the upper surface 36 of the member 16 and the top surface 22 of the cooling plate 14 is in direct contact with and presses against the lower surface 40 of the member 16.

In FIG. 1, a single discrete thermal interface member 16 is associated with each discrete battery module 12 disposed on the cooling plate 14. However, in other embodiments, a unitary thermal interface member (not shown) may be disposed on the cooling plate 14, between the top surface 22 of the cooling plate 14 and the lower ends 28 of the battery cells 18 of two or more battery modules 12.

Referring now to FIGS. 3-7, the thermal interface member 16 comprises a conformable substrate 42, a cover layer 44 disposed on the substrate 42, and a layered heater 46 sandwiched between the substrate 42 and the cover layer 44.

Figure 2:
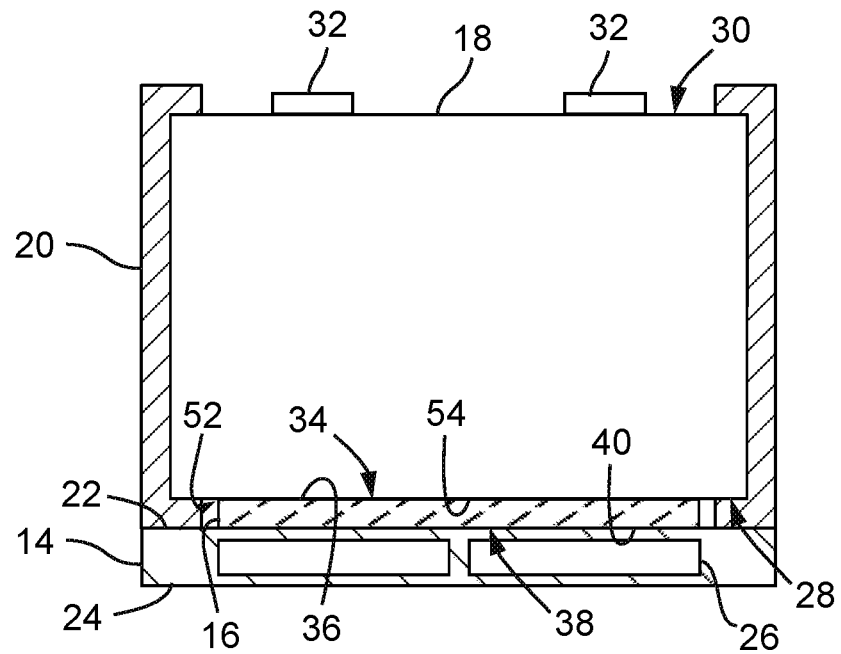
FIG. 2 is a side cross-sectional view of one of the battery modules of FIG. 1 taken along line 2-2 illustrating the location of the thermal interface member between a lower end of one of the battery cells and a top surface of the cooling plate.
Figure 3:
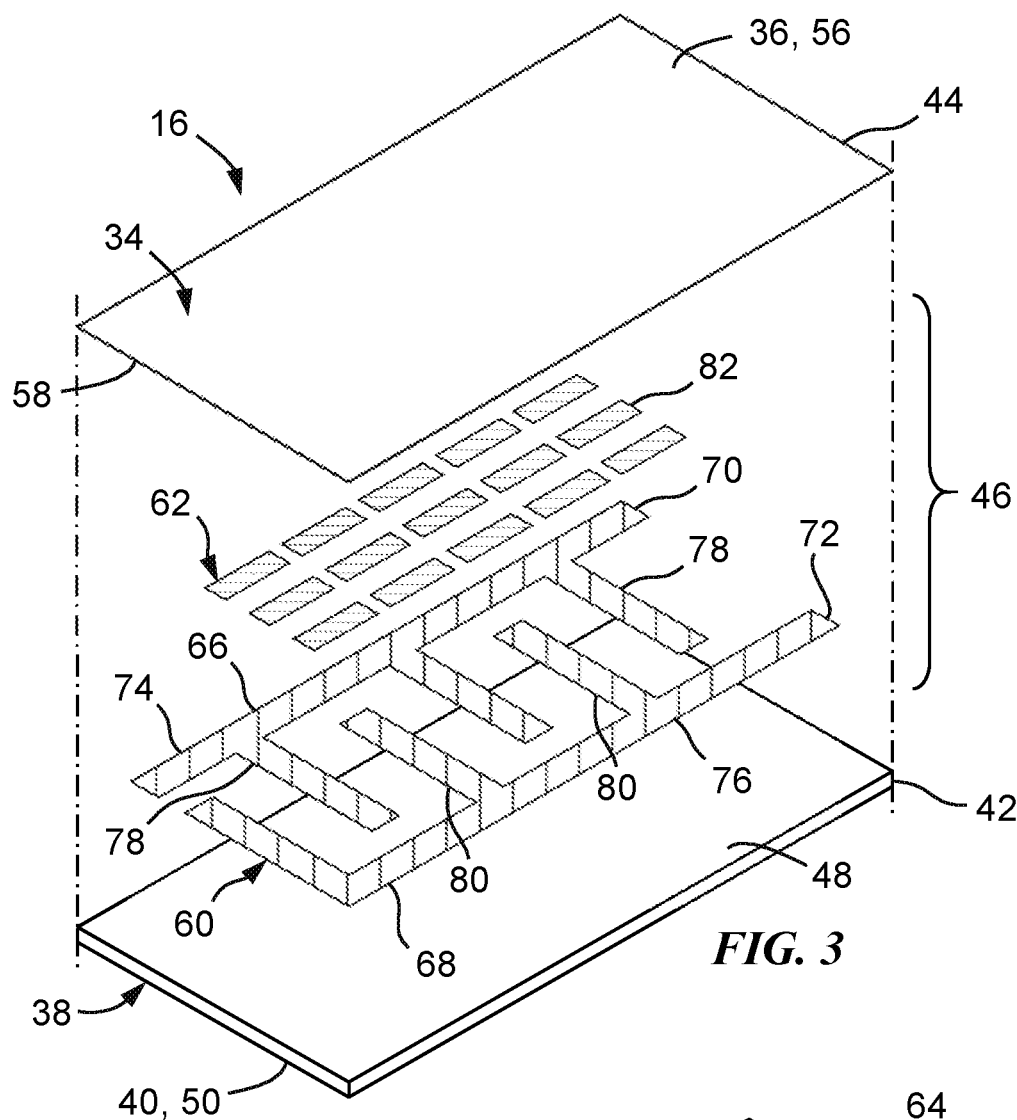
FIG. 3 is a schematic exploded perspective view of the thermal interface member of FIG. 2, according to one or more embodiments of the present disclosure, wherein the thermal interface member includes a layered heating element comprising a resistive layer and a conductive layer.
Figure 4:
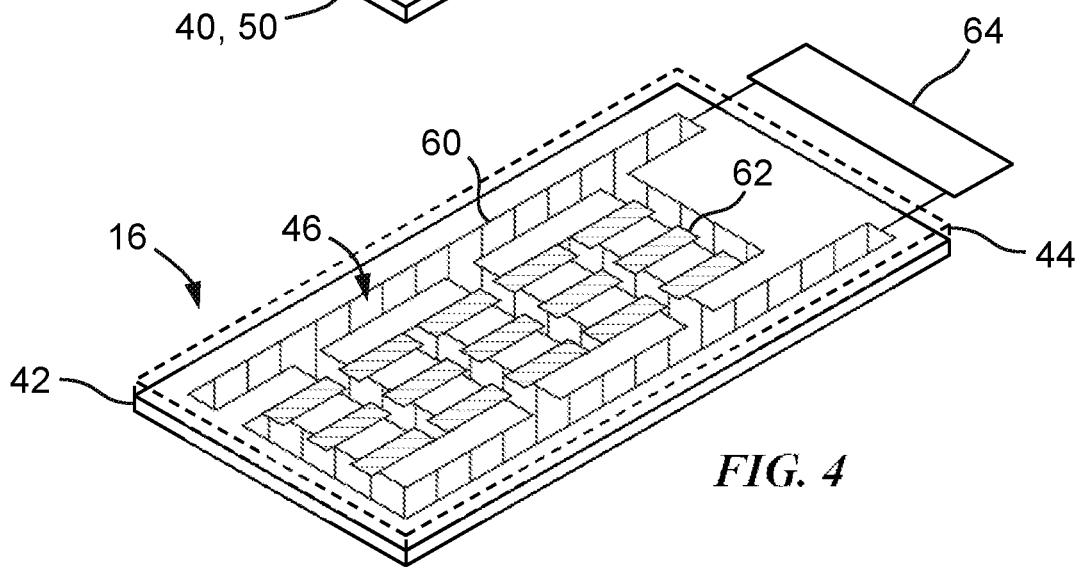
FIG. 4 is a perspective view of the thermal interface member of FIG. 3.

The conformable substrate 42 establishes continuous physical and thermal contact between the thermal interface member 16 and the lower ends 28 of each of the battery cells 18 to ensure effective and efficient heat transfer between the layered heater 46 of the thermal interface member 16 and the battery cells 18 (and between the cooling plate 14 and the battery cells 18), while also preventing electrical contact therebetween. The conformable substrate 42 is located on the second side 38 of the thermal interface member 16 and comprises a first side defining a first surface 48 and an opposite second side defining an opposite second surface 50, with the lower surface 40 of the thermal interface member 16 being defined by the second surface 50 of the conformable substrate 42. In assembly, the conformable substrate 42 (and the overlying layered heater 46 and cover layer 44) are pressed against and conform to the shape of the lower ends 28 of the battery cells 18 such that a zero-gap interface 52 (FIG. 2) is established between the upper surface 36 of the thermal interface member 16 and an opposing surface 54 (FIG. 2) defined by the lower end 28 of each of the battery cells 18.

The conformable substrate 42 may comprise a physically compliant electrically insulating and thermally conductive material. For example, the compliant electrically insulating and thermally conductive material of the conformable substrate 42 may comprise a polymeric material, e.g., a silicone-, siloxane-, epoxy-, alkyd-, acrylic-, polyisobutylene-, polyurethane-, polyvinylidene-, polycycloolefin-, and/or cyclooctene-based material. In one form, the compliant electrically insulating and thermally conductive material may comprise a mixture of a polymeric material and one or more thermally conductive additive materials in powder form dispersed in the polymeric material. In such case, the polymeric material may be referred to as a polymeric matrix phase and the thermally conductive additive material may be referred to as a dispersed phase. The thermally conductive additive material(s) may be present in the polymeric material in an amount, by weight, in the range of 5% to 50%. Examples of electrically insulating, thermally conductive additive materials include: boron nitride, alumina, silicon nitride, silicon carbide, aluminum nitride, diamond, synthetic diamond, expanded graphene, and combinations thereof. In one form, the physically compliant electrically insulating and thermally conductive material of the conformable substrate 42 may have a thermal conductivity in the range of 0.1-50 watts per meter-kelvin (W/(m·K)). For example, the physically compliant electrically insulating and thermally conductive material of the conformable substrate 42 may have a thermal conductivity in the range of 1-15 W/(m·K).

The physically compliant electrically insulating and thermally conductive material of the conformable substrate 42 may be selected to be easily formable from a planar geometry into a variety of shapes without negatively impacting the integrity or functionality of the components of the layered heater 46 formed thereon. In addition, the material of the conformable substrate 42 may be selected to provide good adhesion to the lower ends 28 of the battery cells 18 and to the components of the layered heater 46, without requiring use of an adhesive material therebetween.

The cover layer 44 is located on the first side 34 of the thermal interface member 16 and comprises a first surface 56 and an opposite second surface 58, with the upper surface 36 of the thermal interface member 16 being defined by the first surface 56 of the cover layer 44. In assembly, the cover layer 44 overlies the conformable substrate 42, with the first surface 56 of the cover layer 44 facing toward the opposing surface 54 defined by the lower ends 28 of the battery cells 18 and the second surface 58 of the cover layer 44 facing toward the first surface 48 of the conformable substrate 42 and toward the top surface 22 of the cooling plate 14. The cover layer 44 extends over the entire layered heater 46 and physically protects and electrically isolates the layered heater 46 from the battery cells 18 and surrounding environment. The cover layer 44 may comprise a flexible electrically insulating polymeric material. For example, the cover layer 44 may comprise polyethylene, e.g., polyethylene terephthalate (PET). The cover layer 44 may have a thickness in the range of 5-50 micrometers.

The layered heater 46 is configured to generate and supply a regulated amount of heat to the battery cells 18 of the battery module 12 and includes an electrically conductive layer 60 and an electrically resistive layer 62 in physical and electrical contact with the conductive layer 60. The conductive layer 60 and the resistive layer 62 of the heater 46 are formed directly or indirectly on the first surface 48 of the conformable substrate 42 and, in assembly, are sandwiched between the first surface 48 of the conformable substrate 42 and the second surface 58 of the cover layer 44.

The conductive layer 60 couples the resistive layer 62 to an external power source 64 and comprises a pattern of spaced-apart first and second electrodes 66, 68 respectively coupled to a pair of negative and positive polarity electric contact terminals 70, 72, which may be formed with the electrodes 66, 68 on the first surface 48 of the conformable substrate 42. In FIGS. 3-7, the first and second electrodes 66, 68 are formed in a polygonal pattern and comprise two parallel bus bars 74, 76 respectively extending from the negative and positive polarity electric contact terminals 70, 72 and a plurality of spaced-apart parallel interdigitated fingers 78, 80, with adjacent fingers 78, 80 being connected to opposite bus bars 74, 76 and extending in opposite directions from their respective bus bars 74, 76. However, in other embodiments, the pattern embodied by the first and second electrodes 66, 68 may be different. For example, in one form, the first and second electrodes 66, 68 may be formed in a circular concentric pattern.

The conductive layer 60 comprises a thermally and electrically conductive material. Examples of thermally and electrically conductive materials include: copper (Cu), gold (Au), silver (Ag), aluminum (Al), nickel (Ni), zinc (Zn), carbon (C), graphite, and/or appropriately oriented graphene. In one form, the conductive layer 60 may comprise a printable electrically conductive ink including an electrically conductive material in powder form, which may be applied to the first surface 48 of the conformable substrate 42 and then dried or baked to form the conductive layer 60. For example, the conductive layer 60 may be formed on the first surface 48 of the conformable substrate 42 via screen-printing, contact-printing, gravure, etching, ink jet, photoresist technology, painting, spraying, coating, dipping, or any other suitable technique, which may or may not involve the use of a mask or stencil.

Figure 5:
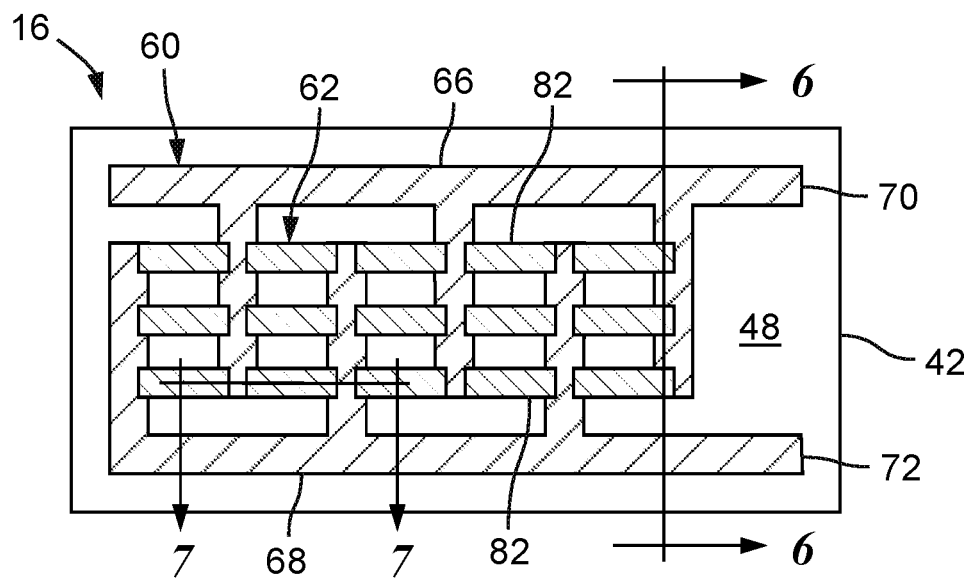
FIG. 5 is a top view of the thermal interface member of FIG. 4.

The resistive layer 62 is in direct physical and electrical contact with the first and second electrodes 66, 68 of the conductive layer 60 and is configured to generate heat when an electric current is passed therethrough. The resistive layer 62 may comprise a plurality of discrete resistive heating elements 82, with each heating element 82 forming a bridge between the first and second electrodes 66, 68. In particular, as best shown in FIG. 5, each heating element 82 may form a bridge between adjacent fingers 78, 80 of the respective first and second electrodes 66, 68. As such, when an electric current is applied to the contact terminals 70, 72 by the external power source 64, an electric current may flow through the heating elements 82 disposed between the first and second electrodes 66, 68 of the resistive layer 62 so that heat is generated in the heating elements 82 and transferred through the cover layer 44 to the battery cells 18 by thermal conduction.

The resistive layer 62 comprises a thermally conductive and electrically resistive material and may be formed on the first surface 48 of the conformable substrate 42 using any of the techniques described above with respect to the conductive layer 60. In one form, the resistive layer 62 may comprise a material having a positive resistance temperature coefficient (referred to as a PTC material) and a resistance that increases with an increase in temperature. For example, the resistive layer 62 may comprise a PTC material that exhibits a sharp change in resistivity at a certain temperature referred to as the switching temperature, $T_s$, of the material. In such case, when the heating elements 82 are at a temperature below the switching temperature of the PTC material, current will pass through the heating elements 82 when an electric current is applied to the contact terminals 70, 72 causing the heating elements 82 to generate heat. As the temperature of the heating elements 82 increases, the resistivity of the PTC material will also increase until the switching temperature is reached, at which point the heating elements 82 will no longer conduct current and will not generate heat. As such, using a PTC material as the resistive material of the resistive layer 62 can help regulate the amount of heat generated by the layered heater 46 and thus can help regulate the amount of heat supplied to the battery cells 18 via thermal conduction, without use of any external diagnostic or feedback controls.

When a PTC material is used as the resistive material of the resistive layer 62, the resistive layer 62 may comprise a printable electrically conductive ink including particles of an electrically conductive material dispersed in a polymeric binder material. In such case, the polymeric binder material may be referred to as a polymeric matrix phase and the electrically conductive material may be referred to as a dispersed phase. The polymeric binder material may comprise a crystalline thermoplastic polymer. Examples of crystalline thermoplastic polymers include crystalline polyolefins (e.g., polyethylene and/or polypropylene), acetals, nylon, and/or thermoplastic polyesters (e.g., polybutylene terephthalate (PBT) and/or polyethylene terephthalate (PET)). The electrically conductive material dispersed in the polymeric binder material of the PTC material may comprise any of the thermally and electrically conductive materials described above with respect to the conductive layer 60.

Figure 6:
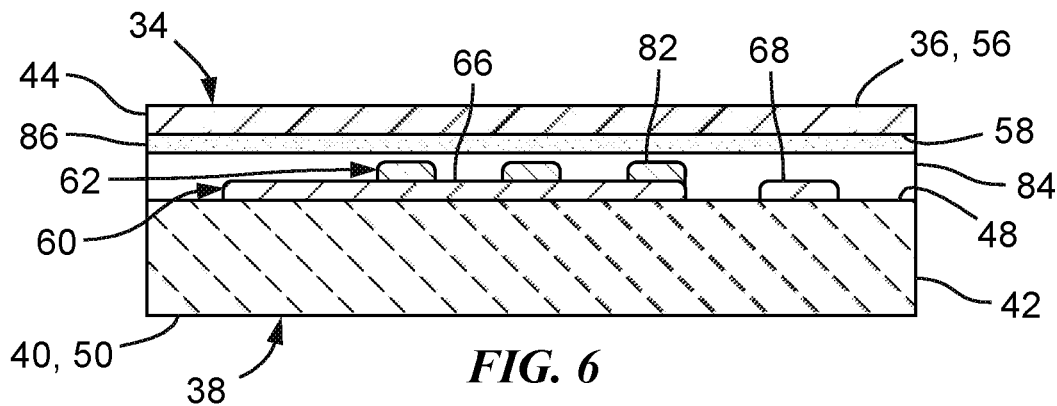
FIG. 6 is a side cross-sectional view of the thermal interface member of FIG. 5 taken along line 6-6.
Figure 7:
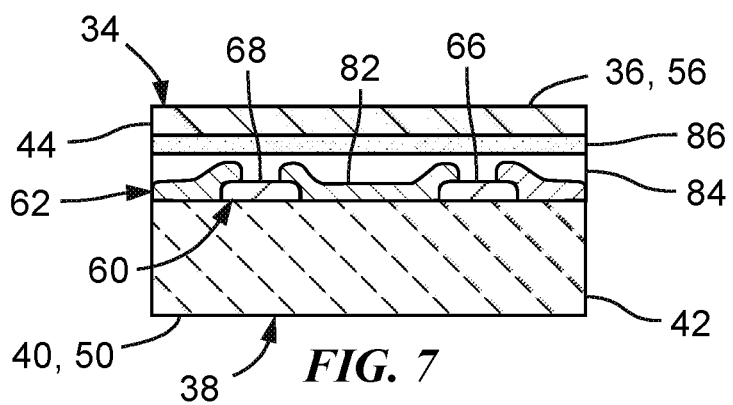
FIG. 7 is a side cross-sectional view of the thermal interface member of FIG. 5 taken along line 7-7.

In the embodiment illustrated in FIGS. 3-7, the conductive layer 60 is formed directly on the first surface 48 of the conformable substrate 42 and the resistive layer 62 is formed on the first surface 48 of the conformable substrate 42 after formation of the conductive layer 60 such that a portion of the resistive layer 62 overlaps a portion of the conductive layer 60. As such, as best shown in FIGS. 6 and 7, at least a portion of the resistive layer 62 is indirectly formed on the first surface 48 of the conformable substrate 42 over the conductive layer 60 and at least a portion of the resistive layer 62 is formed directly on the first surface 48 of the conformable substrate 42. In other embodiments (not shown), the resistive layer 62 may be formed directly on the first surface 48 of the conformable substrate 42 and the conductive layer 60 may be formed on the first surface 48 of the conformable substrate 42 after formation of the resistive layer 62 such that a portion of the conductive layer 60 overlaps a portion of the resistive layer 62. In such case, at least a portion of the conductive layer 60 may be indirectly formed on the first surface 48 of the conformable substrate 42 over the resistive layer 62 and at least a portion of the conductive layer 60 may be formed directly on the first surface 48 of the conformable substrate 42.

In one form, the conductive layer 60 (or the resistive layer 62) may be formed directly or indirectly on the first surface 48 of the conformable substrate 42 and the resistive layer 62 (or the conductive layer 60) may be formed directly or indirectly on the second surface 58 of the cover layer 44. In such case, after the respective formation of the conductive and resistive layers 60, 62 on the conformable substrate 42 and the cover layer 44, the conductive and resistive layers 60, 62 may be brought into direct physical and electrical contact with each other to form the layered heater 46 by bringing the first surface 48 of the conformable substrate 42 and the second surface 58 of the cover layer 44 together such that the conductive and resistive layers 60, 62 are sandwiched therebetween.

As shown in FIGS. 6 and 7, after formation of the layered heater 46, a protective barrier layer 84 may be formed on the first surface 48 of the conformable substrate 42 over the conductive and resistive layers 60, 62 to protect the layered heater 46 from exposure to an external environment and to electrically insulate the layered heater 46 from surrounding components. In one form, the layered heater 46 may be at least partially encased within the barrier layer 84. The protective barrier layer 84 may comprise an electrically insulating dielectric material, e.g., a dielectric ink, and may be formed on the first surface 48 of the conformable substrate 42 using any of the techniques described above with respect to the conductive layer 60.

An adhesive layer 86 may be formed on the first surface 48 of the conformable substrate 42 over the barrier layer 84 and may bond the cover layer 44 to the conformable substrate 42 and/or to one or more intermediate layers formed therebetween, e.g., the barrier layer 84 and/or the layered heater 46. In one embodiment, the adhesive layer 86 may be used in lieu of the barrier layer 84. In another embodiment, the adhesive layer 86 may be used in combination with the barrier layer 84. In one form, the adhesive layer 86 may comprise a pressure sensitive adhesive. The adhesive layer 86 comprises an adhesive material, which may comprise an epoxy, urethane, methacrylate, cyanoacrylate, rubber, polyvinyl acetate, and/or acrylic.

After assembly of the thermal interface member 16, the thermal interface member 16 may be placed on the top surface 22 of the cooling plate 14 so that the lower surface 40 of the member 16 (the second surface 50 of the conformable substrate 42) presses against the top surface 22 of the cooling plate 14 and the upper surface 36 of the member 16 (the first surface 56 of the cover layer 44) faces away from the cooling plate 14. Thereafter, the lower ends 28 of the battery cells 18 may be brought into contact with and pressed against the exposed upper surface 36 of the member 16 (the first surface 56 of the cover layer 44) such that the material of the conformable substrate 42 (and overlying layered heater 46 and cover layer 44, and optional layers 84, 86) deform to the shape of and are molded around the lower ends 28 of the battery cells 18 of the battery module 12. In other embodiments, the thermal interface member 16 may be positioned adjacent and against the lower ends 28 of the battery cells 18, and then the battery cells 18 may be positioned adjacent the cooling plate 14 with the thermal interface member 16 sandwiched therebetween.

In some embodiments, the thermal interface member 16 may be positioned between the top surface 22 of the cooling plate 14 and the lower ends 28 of the battery cells 18 such that the upper surface 36 of the member 16 (the first surface 56 of the cover layer 44) presses against the top surface 22 of the cooling plate 14 and the lower surface 40 of the member 16 (the second surface 50 of the conformable substrate 42) faces away from the top surface 22 of the cooling plate 14. In such case, the lower ends 28 of the battery cells 18 may be brought into contact with and pressed against the lower surface 40 of the member 16 (the second surface 50 of the conformable substrate 42) such that the material of the conformable substrate 42 is in direct contact with the lower ends 28 of the battery cells 18 and deforms to the shape of and is molded around the lower ends 28 of the battery cells 18 of the battery module 12.

Figure 8:
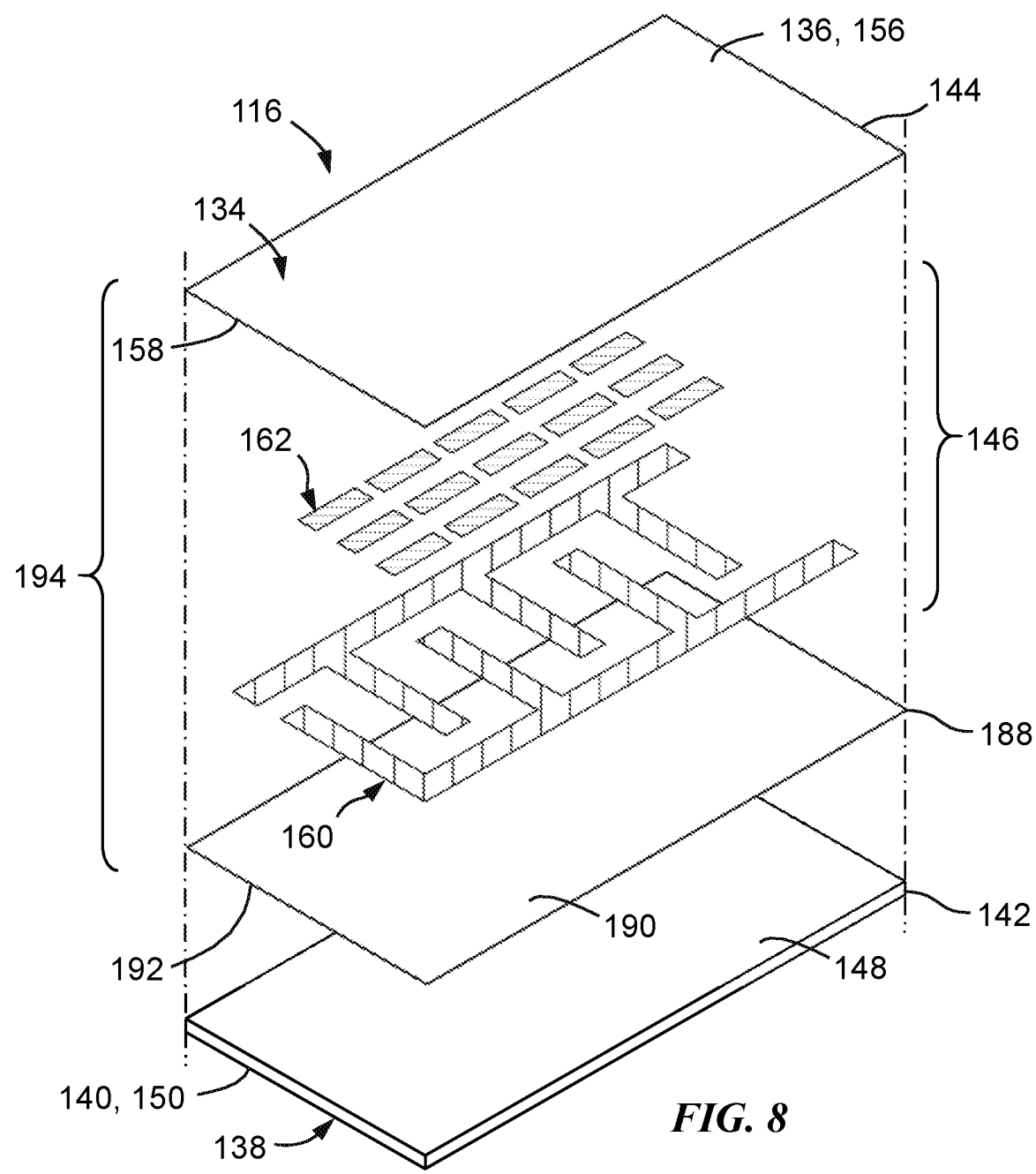
FIG. 8 is a schematic exploded perspective view of another thermal interface member including a layered heater, in accordance with one or more embodiments of the present disclosure.

FIG. 8 illustrates another embodiment of a thermal interface member 116 that may be used to transfer heat away from and to supply heat to the battery cells 18 of the battery modules 12 via thermal conduction. The thermal interface member 116 comprises a conformable substrate 142, a base layer 188 disposed on the substrate 142, and a layered heater 146 sandwiched between the base layer 188 and an overlying cover layer 144. The thermal interface member 116, including the conformable substrate 142, the layered heater 146, and the cover layer 144 are similar in many respects to the thermal interface member 16, the conformable substrate 42, the layered heater 46, and the cover layer 44 described above with respect to FIGS. 3-7 and like numerals between the embodiments generally designate like or corresponding elements throughout the several views of the drawing figures. Description of common subject matter between the embodiments and like or corresponding elements thereof generally may not be repeated here.

The thermal interface member 116 includes a first side 134 that defines an upper surface 136 of the thermal interface member 116 and an opposite second side 138 that defines a lower surface 140 of the thermal interface member 116. The thermal interface member 116 is disposed between and in thermal contact with the top surface 22 of the cooling plate 14 and with the lower ends 28 of the battery cells 18 of the battery module 12. In particular, the thermal interface member 116 is sandwiched between the top surface 22 of the cooling plate 14 and the lower end 28 of each battery cell 18 such that the lower end 28 of each battery cell 18 is in direct contact with and presses against the upper surface 136 of the member 116 and the top surface 22 of the cooling plate 14 is in direct contact with and presses against the lower surface 140 of the member 116.

The conformable substrate 142 establishes continuous physical and thermal contact between the thermal interface member 116 and the lower ends 28 of each of the battery cells 18 to ensure effective and efficient heat transfer between the layered heater 146 of the thermal interface member 116 and the battery cells 18 (and between the cooling plate 14 and the battery cells 18), while also preventing electrical contact therebetween. The conformable substrate 142 is located on the second side 138 of the thermal interface member 116 and comprises a first surface 148 and an opposite second surface 150, with the lower surface 140 of the thermal interface member 116 being defined by the second surface 150 of the conformable substrate 142. In assembly, the conformable substrate 142 (and the overlying base layer 188, layered heater 146, and cover layer 144) are pressed against and conform to the shape of the lower ends 28 of the battery cells 18 such that a zero-gap interface 52 is established between the upper surface 136 of the thermal interface member 116 and the opposing surface 54 defined by the lower end 28 of the battery cells 18. The conformable substrate 142 may comprise the same materials as that of the substrate 42.

The cover layer 144 is located on the first side 134 of the thermal interface member 116 and comprises a first surface 156 and an opposite second surface 158, with the upper surface 136 of the thermal interface member 116 being defined by the first surface 156 of the cover layer 144. In assembly, the cover layer 144 overlies the base layer 188 and the conformable substrate 142, with the first surface 156 of the cover layer 144 facing toward the lower ends 28 of the battery cells 18 and the second surface 158 of the cover layer 144 facing toward the base layer 188 and the first surface 148 of the conformable substrate 142 (and toward the top surface 22 of the cooling plate 14). The cover layer 144 extends over the entire layered heater 146 and physically protects and electrically isolates the layered heater 146 from the battery cells 18 and the surrounding external environment. The cover layer 144 may comprise the same material as that of the cover layer 44.

The base layer 188 is located on the second side 138 of the thermal interface member 116 and comprises a first surface 190 and an opposite second surface 192. In assembly, the base layer 188 overlies the conformable substrate 142, with the first surface 190 of the base layer 188 facing toward the second surface 158 of the cover layer 144 and the second surface 192 of the base layer 188 facing toward the first surface 148 of the conformable substrate 142. The base layer 188 may comprise the same material as that of the cover layer 44.

The layered heater 146 is configured to generate and supply a regulated amount of heat to the battery cells 18 of the battery module 12 and includes an electrically conductive layer 160 and an electrically resistive layer 162 in physical and electrical contact with the conductive layer 160. The conductive layer 160 and the resistive layer 162 of the heater 146 are formed on the first surface 190 of the base layer 188 and, in assembly, are sandwiched between the first surface 190 of the base layer 188 and the second surface 158 of the cover layer 144.

In assembly, the conductive and resistive layers 160, 162 of the layered heater 146 may be formed on the first surface 190 of the base layer 188. Then, the cover layer 144 may be coupled to the base layer 188 with the layered heater 146 sandwiched therebetween to form a stand-alone flexible laminar heating device 194, including the cover layer 144, the layered heater 146, and the base layer 188. A protective barrier layer and/or an adhesive layer (not shown) optionally may be formed on the first surface 190 of the base layer 188 (over the layered heater 146) and may help bond the cover layer 144 to the base layer 188. In one form, the first surface 148 of the conformable substrate 142 may be applied, bonded, or otherwise coupled to the second surface 192 of the base layer 188 to form the thermal interface member 116. In another form (not shown), the first surface 148 of the conformable substrate 142 may be applied, bonded, or otherwise coupled to the first surface 156 of the cover layer 144 to form the thermal interface member 116. Thereafter, the thermal interface member 116 may be placed on the top surface 22 of the cooling plate 14 so that the upper surface 136 or the lower surface 140 of the member 116 presses against the top surface 22 of the cooling plate 14. Thereafter, the lower ends 28 of the battery cells 18 may be brought into contact with and pressed against the exposed lower or upper surface 140, 136 of the member 116 such that the material of the conformable substrate 142 (and the overlying layers

188, 160, 162, 144) deform to the shape of and are molded around the lower ends 28 of the battery cells 18 of the battery module 12.

Figure 9:
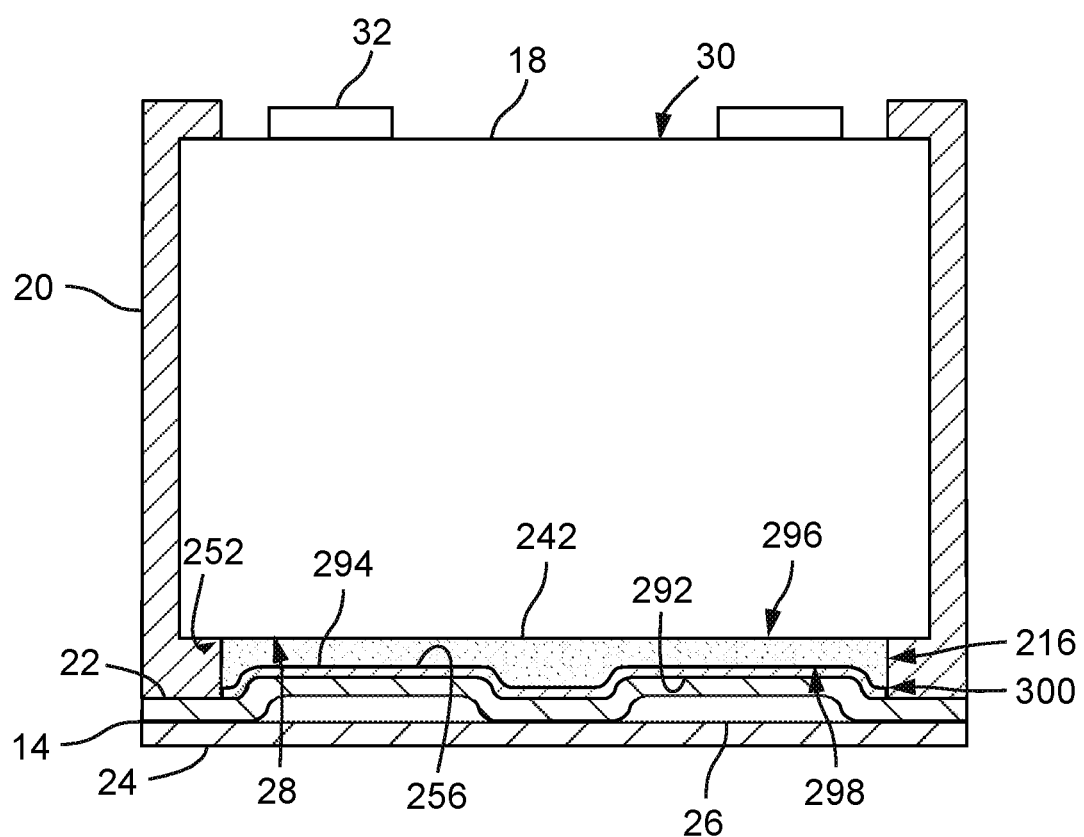
FIG. 9 is a schematic side cross-sectional view of a battery module supported on a cooling plate and having a thermal interface member disposed therebetween, in accordance with one or more embodiments of the present disclosure.

FIG. 9 illustrates another embodiment of a thermal interface member 216 that may be used to transfer heat away from and to supply heat to the battery cells 18 of the battery modules 12 via thermal conduction. The thermal interface member 216 comprises a stand-alone flexible laminar heating device 294 and a formed in-place heat transfer layer 242. The laminar heating device 294 is similar in many respects to the laminar heating device 194 described above with respect to FIG. 8 and like numerals between the embodiments generally designate like or corresponding elements throughout the several views of the drawing figures. Description of common subject matter between the embodiments and like or corresponding elements thereof generally may not be repeated here.

The laminar heating device 294 includes a first surface 256 and an opposite second surface 292. Like the laminar heating device 194 described above with respect to FIG. 8, the laminar heating device 294 may comprise a base layer, a cover layer coupled to the base layer, and a layered heater sandwiched therebetween (not shown). The cover layer and base layer may respectively define the first surface 256 and the second surface 292 of the heating device 294, or vice versa.

After formation of the heating device 294, the device 294 may be positioned over the top surface 22 of the cooling plate 14. In one form, the heating device 294 may be positioned directly on the top surface 22 of the cooling plate 14 such that the first surface 256 or the second surface 292 (defined by the cover layer or the base layer) is in direct contact with and presses against the upper top surface 22 of the cooling plate 14. Thereafter, the heat transfer layer 242 may be formed in-place between the heating device 294 and the lower end 28 of the battery cells 18 to establish thermal contact therebetween so that heat may be transferred from the heating device 294, through the heat transfer layer 242, to the battery cells 18 via thermal conduction. In addition, the heat transfer layer 242 may establish thermal contact between the heating device 294 and the lower end 28 of the battery cells 18 so that heat can be transferred away from the battery cells 18, through the heat transfer layer 242, to the cooling plate 14 via thermal conduction.

The heat transfer layer 242 comprises an upper end 296 and an opposite lower end 298 and may be made of the same material as that of the conformable substrate 42. The heat transfer layer 242 may be formed in-place between the heating device 294 and the lower end 28 of the battery cells 18, for example, by depositing a physically compliant electrically insulating and thermally conductive material in the form of a liquid or a gel over the heating device 294 on the top surface 22 of the cooling plate 14. Then, the lower ends 28 of the battery cells 18 may be placed into the liquid or gel such that the liquid or gel flows around the lower end 28 of each of the cells 18 of the battery module 12. Thereafter, the liquid or gel may be cured or cross-linked to substantially decrease the flowability thereof. After the liquid or gel is cross-linked, a first zero-gap interface 252 is established between the lower ends 28 of the battery cells 18 and an opposing surface defined by the upper end 296 of the heat transfer layer 242. At the same time, a second zero-gap interface 300 is established between first surface 256 of the laminar heating device 294 and an opposing surface defined by the lower end 298 of the heat transfer layer 242.

The foregoing description is not a definition of the invention but is a description of one or more exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A thermal interface member disposed between a cooling plate and a battery module, the thermal interface member comprising:
    a compliant electrically insulating and thermally conductive substrate having a first surface and an opposite second surface, the substrate comprising a polymeric matrix phase and a dispersed phase of thermally conductive particles; and
    a layered heater disposed on the first surface of the substrate, the layered heater including:
        an electrically conductive layer disposed on the first surface of the substrate, the conductive layer being patterned into a first electrode and a second electrode spaced apart from the first electrode on the first surface of the substrate; and
        an electrically resistive layer disposed on the first surface of the substrate, the resistive layer being in electrical contact with the first and second electrodes of the conductive layer and comprising a resistive material having a positive resistance temperature coefficient and a resistance that increases with an increase in temperature.

2. The thermal interface member of claim 1 wherein at least a portion of the conductive layer and at least a portion of the resistive layer are in direct contact with the first surface of the substrate, and wherein at least a portion of the resistive layer partially overlaps a portion of the conductive layer on the first surface of the substrate.

3. The thermal interface member of claim 1 wherein at least a portion of the resistive layer is formed on the first surface of the substrate over the conductive layer.

4. The thermal interface member of claim 1 wherein at least a portion of the conductive layer is formed on the first surface of the substrate over the resistive layer.

5. The thermal interface member of claim 1 wherein the polymeric matrix phase of the substrate comprises at least one of a silicone-, siloxane-, epoxy-, acrylic-, alkyd-, polyisobutylene-, polyurethane-, polyvinylidene-, polycycloolefin-, or cyclooctene-based material, and wherein the dispersed phase of thermally conductive particles comprises at least one of boron nitride, alumina, silicon nitride, silicon carbide, aluminum nitride, diamond, synthetic diamond, or expanded graphene.

6. The thermal interface member of claim 1 wherein the conductive layer comprises at least one of copper (Cu), gold (Au), silver (Ag), aluminum (Al), nickel (Ni), zinc (Zn), carbon (C), graphite, or graphene.

7. The thermal interface member of claim 1 wherein the resistive layer comprises a polymeric matrix phase and a dispersed phase of electrically conductive particles, and wherein the polymeric matrix phase of the resistive layer comprises a crystalline thermoplastic polymer.

8. The thermal interface member of claim 1 comprising:
a cover layer disposed on the first surface of the substrate, the cover layer comprising a flexible electrically insulating material, and
wherein the conductive layer and the resistive layer are sandwiched between the cover layer and the first surface of the substrate.

9. The thermal interface member of claim 8 wherein the cover layer is physically bonded to the first surface of the substrate via an adhesive layer.

10. The thermal interface member of claim 1 comprising:
a base layer disposed on the first surface of the substrate, the base layer comprising a flexible electrically insulating material, and
wherein the conductive layer and the resistive layer are disposed on the first surface of the substrate over the base layer.

11. The thermal interface member of claim 1 comprising:
an external power source electrically coupled to the conductive layer.

12. An electric power supply for a vehicle comprising:
a cooling plate;
a battery module supported on the cooling plate, the battery module comprising a stack of battery cells, with each of the battery cells having a lower end adjacent the cooling plate and an opposite upper end extending away from the cooling plate; and
a thermal interface member disposed between the cooling plate and the battery module,
wherein the thermal interface member comprises:
a compliant electrically insulating and thermally conductive substrate having a first surface and an opposite second surface, the substrate comprising a polymeric matrix phase and a dispersed phase of thermally conductive particles;
an electrically conductive layer disposed on the first surface of the substrate, the conductive layer being patterned into a first electrode and a second electrode spaced apart from the first electrode on the first surface of the substrate; and
an electrically resistive layer disposed on the first surface of the substrate, the resistive layer being in electrical contact with the first and second electrodes of the conductive layer and comprising a resistive material having a positive resistance temperature coefficient and a resistance that increases with an increase in temperature.

13. The electric power supply of claim 12 wherein the thermal interface member conforms to the shape of the lower ends of the battery cells such that a zero-gap interface is established between a surface of the thermal interface member and an opposing surface defined by the lower ends of the battery cells.

14. The electric power supply of claim 12 wherein the thermal interface member is disposed between the cooling plate and the battery module such that the electrically conductive layer and the electrically resistive layer are sandwiched between the thermally conductive substrate and the lower ends of the battery cells.

15. A method of manufacturing an electric power supply for a vehicle, the method comprising:
manufacturing a thermal interface member by:
providing a compliant electrically insulating and thermally conductive substrate having a first surface and an opposite second surface, the substrate comprising a polymeric matrix phase and a dispersed phase of thermally conductive particles; and
forming a layered heater on the first surface of the substrate by:
applying an electrically conductive layer to the first surface of the substrate, the conductive layer being patterned into a first electrode and a second electrode spaced apart from the first electrode on the first surface of the substrate; and
applying an electrically resistive layer to the first surface of the substrate, the resistive layer being in electrical contact with the first and second electrodes of the conductive layer and comprising a resistive material having a positive resistance temperature coefficient and a resistance that increases with an increase in temperature; and
placing a first side of the thermal interface member in thermal contact with a plurality of battery cells of a battery module.

16. The method of claim 15 wherein at least a portion of the conductive layer and at least a portion of the resistive layer are formed directly on the first surface of the substrate.

17. The method of claim 15 comprising:
forming the conductive layer directly on the first surface of the substrate; and then
forming the resistive layer on the first surface of the substrate such that at least a portion of the resistive layer overlaps a portion of the conductive layer on the first surface of the substrate.

18. The method of claim 15 comprising:
forming the resistive layer directly on the first surface of the substrate; and then
forming the conductive layer on the first surface of the substrate such that at least a portion of the conductive layer overlaps a portion of the resistive layer on the first surface of the substrate.

19. The method of claim 15 comprising:
providing a base layer having a first surface and an opposite second surface, the base layer comprising a flexible electrically insulating material;
respectively forming the conductive layer and the resistive layer on the first surface of the base layer; and then
placing the base layer on the first surface of the substrate such that the second surface of the base layer faces toward the substrate and the first surface of the base layer faces away from the substrate.

20. The method of claim 15 comprising:
providing a cover layer having a first surface and an opposite second surface, the cover layer comprising a flexible electrically insulating material;
forming the conductive layer or the resistive layer on the second surface of the cover layer;
forming the conductive layer or the resistive layer on the first surface of the substrate; and then
bringing the second surface of the cover layer and the first surface of the substrate together to bring the conductive layer and the resistive layer into electrical contact with one another.

* * * * *